US006457871B1

(12) United States Patent
Edler et al.

(10) Patent No.: US 6,457,871 B1
(45) Date of Patent: Oct. 1, 2002

(54) BEARING MECHANISM

(76) Inventors: James P. Edler, 2062 Chancey, Troy, MI (US) 48098; Clayton W. Guensche, 1371 Whittier, Grosse Pointe Park, MI (US) 48230

( * ) Notice: Subject to any disclaimer, the term of this patent is extended or adjusted under 35 U.S.C. 154(b) by 0 days.

(21) Appl. No.: 09/830,192

(22) PCT Filed: Apr. 23, 2001

(86) PCT No.: PCT/US01/13064

§ 371 (c)(1),
(2), (4) Date: Apr. 23, 2001

Related U.S. Application Data

(60) Provisional application No. 60/198,868, filed on Apr. 21, 2000.

(51) Int. Cl.[7] .............................................. F16C 19/08
(52) U.S. Cl. ........................ 384/542; 384/517; 384/544
(58) Field of Search ................................ 384/542, 517, 384/503, 543, 563, 544

(56) References Cited

U.S. PATENT DOCUMENTS 4,865,472 A * 9/1989 Jacob ......................... 384/503
4,961,654 A * 10/1990 Pangburn et al. ........... 384/517

* cited by examiner

Primary Examiner—Lenard A. Footland
(74) Attorney, Agent, or Firm—Lynn E. Cargill

(57) ABSTRACT

A bearing mechanism including two substantially identical ball bearings, each having a longitudinal axis and an inner and an outer race with grooved surfaces facing each other in the races, said bearings being placed in a substantially parallel configuration once assembled in the resultant bearing mechanism, an inner tubular sleeve extending between and against the two substantially parallel ball bearings, said inner sleeve having a thickness and an outer diameter that substantially matches the dimensions of the inner and outer races of the ball bearings, and two bearing caps to be inserted through the two ball bearings, said bearing caps having a substantially tubular shape, each with a flange extending outwardly from one end of the tubular shaped bearing cap, the thickness of the flange matching the dimensions of the inner and/or outer race of the bearings such that, once assembled, the flanges contact the outside surfaces of the races of the substantially parallel ball bearings, thereby exerting a force on the outside surface of the inner and/or outer race in a substantially perpendicular direction with respect to the longitudinal axis of the ball bearing. This configuration holds the bearings in an optimum position to reduce friction to a bear minimum. This configuration also allows for the interchangeability of bearings into various personal transport devices including, but not limited to, in-line skates, scooters and/or skateboards.

15 Claims, 4 Drawing Sheets

BEARING MECHANISM

CROSS REFERENCES TO RELATED APPLICATIONS

This application claims the benefit of U.S. Provisional Application No. 60/198,868 filed on Apr. 21, 2000.

TECHNICAL FIELD

This invention relates generally to bearings, and more particularly to a bearing mechanism which is usable in personal transport devices including in-line skates, skateboards and scooters.

BACKGROUND OF THE INVENTION

Recently, personal transport devices, including in-line skates, skateboards, scooters and other similarly wheeled vehicles, have become very popular in the United States, Asia, South America and Europe. The company Roller Blade of Minnesota popularized in-line skating during the 1980s and 1990s. Skateboards also became very popular, particularly on the West Coast of the United States. Recently, the Razor scooters have become extremely popular, not only in the United States, but throughout China and other countries where scooters are used as a form of primary transportation. These three applications use the same wheels, and consequently the same bearings.

Needless to say, the wheels on these wheeled vehicles are very important for their performance. These devices, especially the in-line skates, use a dual-bearing configuration on each wheel. With regards to performance, the bearings are the most important part of the wheel, and are crucial for the speed and reduction of friction, two important aspects of the performance. Some of the wheels and bearings utilize steel balls in the ball bearings, while the more expensive ones use ceramic balls. Ceramic ball bearings outperform steel ball bearings significantly. Regardless of the balls used, the bearings conventionally consist of a grooved inner ring, or inner race, and a complementary grooved outer ring, or outer race. The balls are held within the grooves, and the inner and outer races rotate about one another.

The wheels themselves are conventionally a cast polyurethane structure around a hard plastic core. The hard plastic core is generally referred to as the "wheel hub", and this hub includes pockets or recesses in the hard plastic core act to receive the roller bearings on either side of the core. These bearing recesses are symmetrical about their axis, and the bearings received therein are substantially identical, working best when they are in a substantially parallel configuration, with the axle being as perpendicular as possible to the parallel bearings.

As one can imagine, uneven loads on the bearings deter the performance of the wheeled vehicle, such that it is a constant task by the owners to re-adjust the bearing pressure in order to hold the bearings in proper placement within the bearing recesses of the wheel hub. It would be advantageous if there were a system to hold the bearings on either side of the wheel hub in an essentially perpendicular fashion to the axle of the wheel, evening out the load and optimizing the pressures.

Attempts to hold the bearings flush to the wheel hub so that the forces are perpendicular to the axle have resulted in mixed success. Some companies have tried to improve the bearings themselves, while others have tried to utilize caps, flanges, rings and the like for holding the bearings in place within the hub. To prolong performance, shields have been used on the "outside" and "inside" surfaces of the bearing races in order to prevent dirt and grime from entering into the cavity where the ball bearings are held. These "shields" have had some modicum of success in preventing grit, dirt and grime which is always present on the sidewalks and roadways on which these wheeled personal transport devices are utilized.

It is general knowledge that the roadways and sidewalks on which these in-line skates, skateboards and scooters are utilized have road grime and dust which will impede the rolling of the ball bearings if the road dust gets between the ball bearing and the groove which holds the ball bearing inside the bearing races. Consequently, it would be a great advantage to have a bearing system which held the ball bearings in their proper place for maximum performance, while allowing for the shields to be used to prevent dirt and grime from entering the bearing race itself. Furthermore, it would also be advantageous if such a bearing system had an interchangeable, inexpensive part which would allow for the use of the same bearings to be used on many different applications.

For instance, a skating enthusiast may decide to spend the extra money for a set of ceramic ball bearings, which can be approximately three to ten times the price of inexpensive steel ball bearings. That skating enthusiast would also want to be able to use those same ceramic bearings not only on their in-line skates, but also on their skateboard, scooter or their hockey, speed, or artistic skates as well. However, the bearings are not all the same size. For example, the ball bearings used on a skateboard typically has an inner diameter of about 8 mm, while fitness in-line skates have an inner diameter of 7 mm, hockey skates have an inner diameter of either 8 or 6.4 mm, while speed skates utilize an inner diameter of 8 or 7 mm. Artistic skates vary across the board. It would be most advantageous to be able to interchangeably utilize these expensive ceramic bearings for all of these applications. Prior to the present invention, each of these different applications required a different set of ball bearings for fitting into the bearing recesses in the wheel hub.

Regardless of the application, the inner race of the ball bearing must stay as stationary as possible in order to achieve maximum performance. Uneven pressures on the bearings cause them to rotate and twist, which causes undue pressures at various angles. As mentioned above, in-line skating enthusiasts have needed to "snug down" the bearings, and continuously re-adjust them as their skating makes the bearings out of alignment.

As mentioned above, these personal transport device applications usually use two bearings for each wheel. Upon reviewing the physics and motion of the bearings, it can be seen that the two bearings will operate at their optimum performance when the bearings are as close to parallel as possible, with both of them being perpendicular to the axis of the wheel hub. Then, the friction of the balls within the grooves of the races will be at a minimum. Everyone will agree that it is best for the ball bearing to be free rolling instead of being bound up by friction.

Prior art methods for adapting these wheels to the various devices mentioned above have included the use of washers, spacers, and all sorts of other arrangements to adapt an axle to a particular bearing. Tightening and loosening the axle to adjust the perpendicularity of the bearings with respect to the axle will result in side loads on the balls which inhibit rolling action. Uneven loads generally result in constantly re-adjusting the axle pressure on the bearings themselves.

Therefore, the present invention is directed towards the creation of a complete bearing system or mechanism which will not distort the bearing races from their optimal perpendicular alignment with respect to the axle, while providing a bearing system which will transmit even loads to the bearings without jeopardizing the performance. Furthermore, it is recognized that it would be most advantageous to include a bearing system which will keep the inner race of the bearing as stationary as possible so that re-adjustment is not necessary as before.

SUMMARY OF THE INVENTION

In order to meet these and other objects and advantages, the present invention provides a complete bearing mechanism which includes certain essential features, including a ball bearing configuration, preferably having nine ball bearings, but which may include seven or more bearings, an inner sleeve for holding the inner race of the bearings steady, and two bearing caps which include flanged structures for receiving an axle therethrough. The bearing cap flanges apply pressure on the outside surfaces of the inner race of each of the bearings, thereby exerting equal pressures from both sides of the inner race against the ball bearing in order to maintain even pressures and loads thereon. This bearing mechanism is to be inserted into a wheel within the wheel hub and to be captured within bearing recesses in the hub, found within the cast urethane wheel itself. Once assembled, the first and second bearing caps hold the bearing races in place within the bearing recesses, while the inner sleeve acts to hold the inside surfaces of the bearing races in proper alignment and position to maximize and optimize the alignment of the bearings within the wheel hub itself.

BRIEF DESCRIPTION OF THE DRAWINGS

In accordance with the present invention, the following drawings may be utilized in conjunction with the detailed description below to more clearly define the present invention.

DETAILED DESCRIPTION OF THE DRAWINGS

In carrying out the objects and advantages of the present invention, a bearing mechanism having at least three components, comprising at least bearings in combination with bearing caps and an inner sleeve constructed in accordance with the present invention is provided. This bearing mechanism, will, once locked in with a conventional fastener as originally purchased, act to stabilize and lock the bearings into a position which is in an optimum configuration being substantially parallel to one another, and simultaneously substantially parallel to the axle or bolt. The tolerances for the dimensions of each of these components is relatively restricted such that when the fastener is tightened, the components of the bearing mechanism become tight against one another on either side of the bearings, holding them in place. Essentially, the inner sleeve acts as a spacer between the two bearings for these dual bearing applications, while the two bearing caps act to hold the whole assembly together from the outside. As discussed above, proper positioning and alignment of the two bearings is required for continued top performance of the bearing and wheel. In order for the personal transport device to exhibit top performance, friction of the ball bearings must be reduced to a bare minimum.

Although the conventional bearings have several different inner and outer diameters to make them applicable in in-line skates, skateboards, scooters and the like, the present invention allows for an interchangeable bearing cap to accommodate those different diameters. This is one of the great advantages of the present invention. As a good set of bearings can be as expensive as the entire skateboard or pair of in-line skates, one should be able to use the same bearings on other applications without having to expend greater amounts of money for additional sets. The interchangeable bearing caps are discussed further hereinbelow.

Having said all that, we now look to the drawings to discuss in detail the structural components of the present invention. One must understand that the drawings are illustrative of the best mode of the invention, although many other configurations are possible, and this patent application is limited in scope only by the appended claims.

Figure 1:
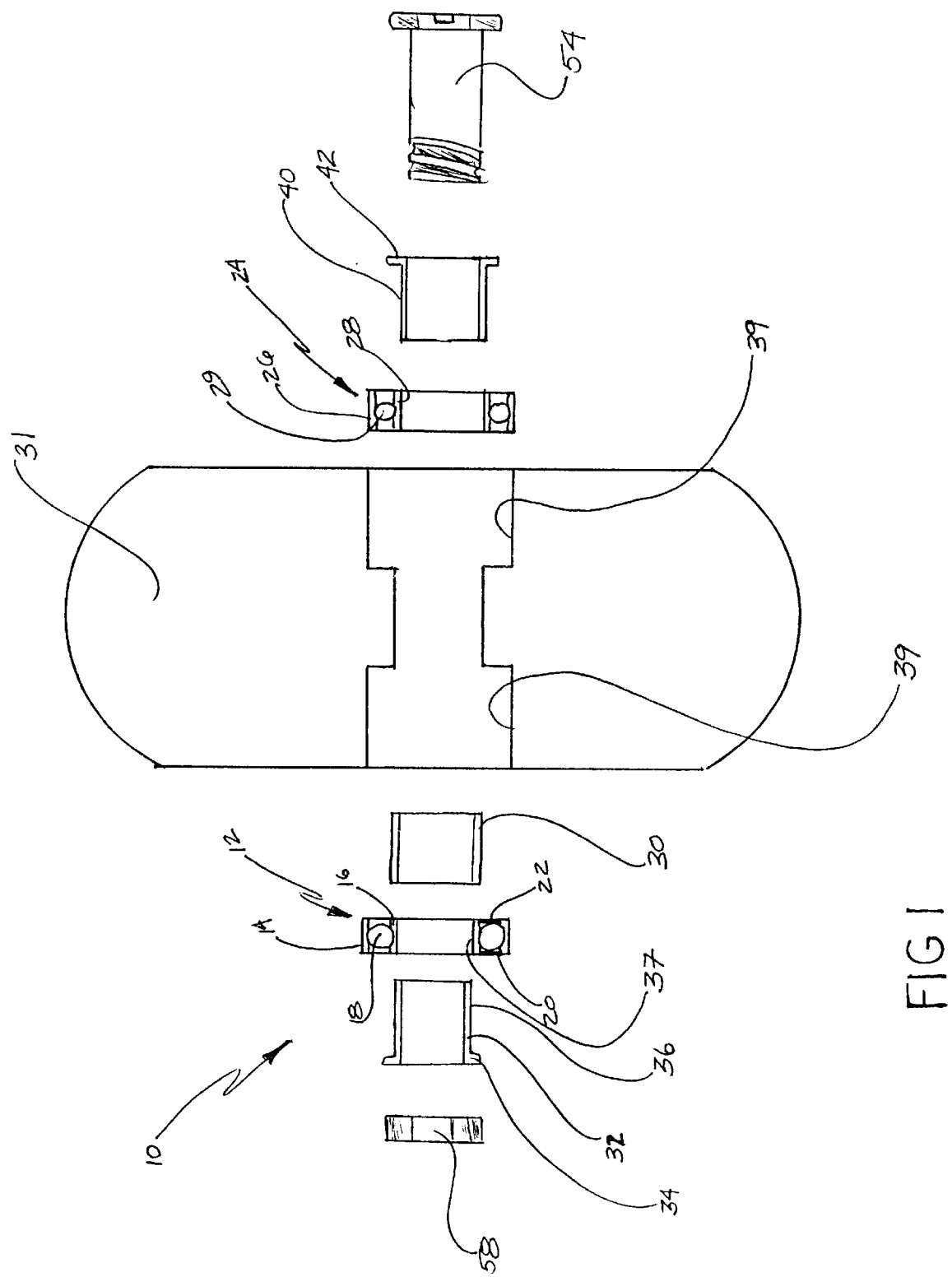
FIG. 1 is an exploded side plan view of a bearing mechanism constructed in accordance with the present invention.

Looking first to FIG. 1, there is shown an exploded, side elevational cutaway view of a bearing mechanism constructed in accordance with the present invention. Throughout the discussion of the numerous drawings, like reference numerals will apply to like parts. FIG. 1 includes a bearing mechanism generally denoted by the numeral 10, including a first bearing 12 having an outer race 14 with a grooved inner surface, and an inner race 16 also having a grooved inner surface. Ball 18 is shown enclosed within the complementary and mating grooved inner surfaces, while an outer shield 20 is shown running the circumference of the ball bearing. An inner shield 22 is also shown, again running the circumference of the ball bearing. A second bearing 24 is shown having an outer race 26, an inner race 28, and also having complementary grooved inner surfaces for holding a ball 29 therein. An inner sleeve 30 is shown which is made of a tube, preferably metal, which has an approximate thickness substantially equal to the thickness of the bearing races, although preferably in the thickness of inner races 16 and 28 of respective bearings 12 and 24. Although not shown in the drawings, many applications will require the thickness of the inner sleeve to approximate the thickness of the combined inner and outer races, and not just the inner race. As will be seen with greater detail in the discussion of FIG. 2A, the inner sleeve acts as a stabilizer between the two bearings as they are held within a wheel 31.

Still looking at FIG. 1, a first bearing cap 32 is designed to slip through the inner diameter of first bearing 12. First bearing cap 32 includes a flange 34 so that the cap will exert pressure from the outside against the outside surface of the bearing races, and preferably just the inner race 16 of bearing 12. Again, although not shown in the drawings, the flange of the bearing cap 32 may also have a dimensional thickness of the combined height of the inner and the outer race. Many applications will find this dimension to be of an advantage.

Regardless, the outer diameter 36 of the bearing cap is adapted to fit snuggly within the inner diameter 37 of ball bearing 12. The inner diameter 38 of first bearing cap 32 is dimensioned to snuggly receive a fastener such as axle or bolt 54 which is used to hold together the entire mechanism. Wheel 31 includes bearing recesses 39 within the hub of the wheel. These bearing recesses 39 are sized in order to receive conventional bearings, usually 22 mm outside diameter. In fact, a typical bearing may be a standard conventional 608 bearing, made by many manufacturers, which has dimensions of 22 mm outside diameter, 7 mm in width, and having an inside diameter of 8 mm. Another conventional bearing is a 627 bearing having an outside diameter of 22 mm, a width of 7 mm, and an interior diameter of 7mm. Therefore, conventional wheels have bearing recesses 39 of an inner diameter of approximately 22 mm in order to receive standard, conventional 22 mm outer diameter ball bearings.

Again referring to FIG. 1, there is also shown second bearing 24 having an outer race 26, an inner race 28, both of these races having complementary grooved inner surfaces to receive a ball 29. Similar to the first bearing, the second bearing has a second bearing cap 40 which also includes a flange 42. The outer diameter 50 of the second bearing cap is also dimensioned to fit within the inner diameter of the second bearing 24. Again, the inner diameter 52 of second bearing cap is sized to receive axle or bolt 54 in a slideable fashion. The outer dimension 56 of the axle or bolt fits snuggly within the inner diameter of the second bearing cap as well.

Figure 2A:
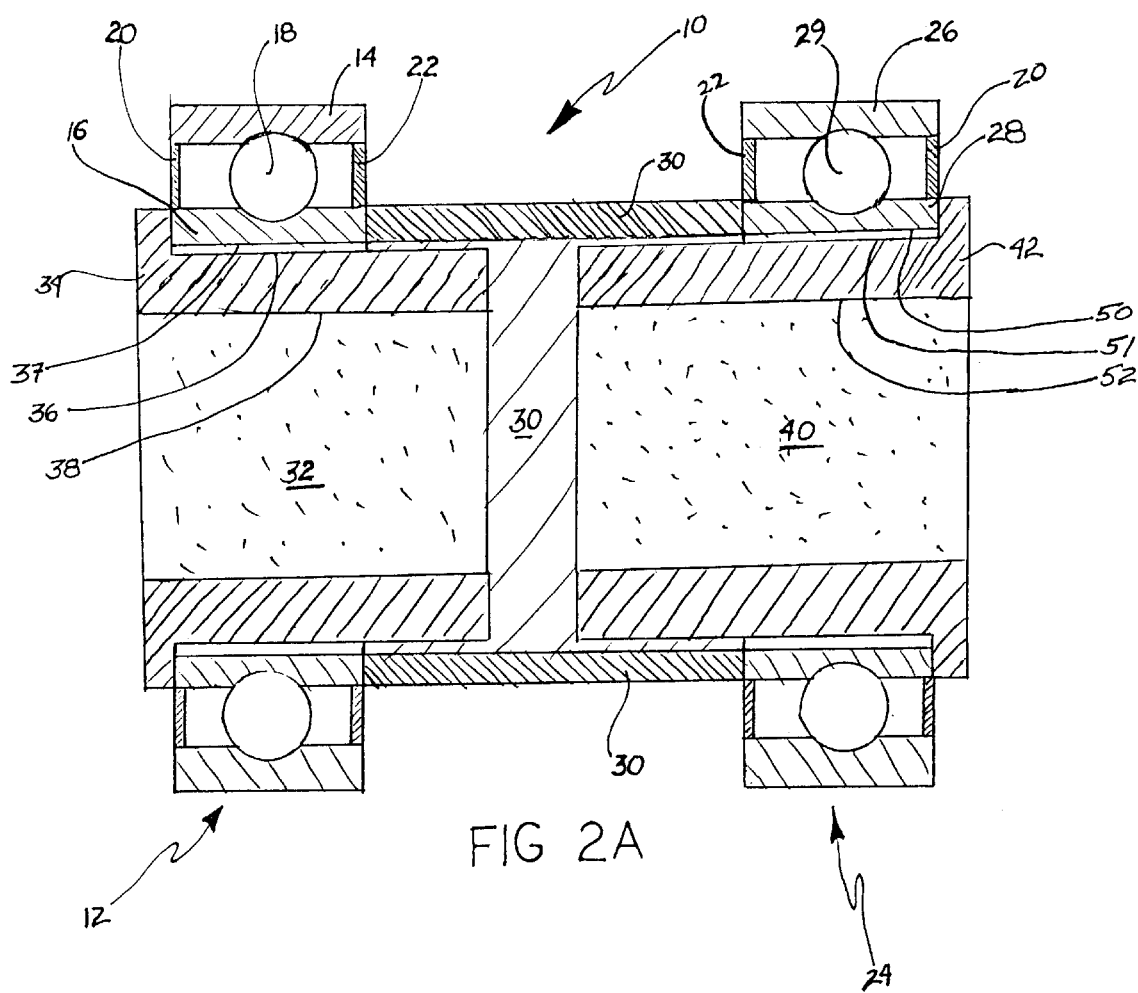
FIG. 2A is a side elevational cutaway view of the bearing mechanism of the present invention as constructed and assembled, shown without the wheel axle therethrough.

Referring next to FIG. 2A, a cutaway view of the preferred embodiment of the present invention is shown without the wheel fastener shown inserted therethrough. Again, the bearing mechanism of the present invention is generally denoted by the numeral 10, and includes a first bearing 12 and a second bearing 24 with an inner sleeve 30 and a first bearing cap 32 and a second bearing cap 40. Without the showing of the fastener, the interior dimensions of the various components can be seen. First and second bearings, 12 and 24, respectively have outer races 14 and 26, as well as inner races 16 and 28. These inner and outer races have grooved inner surfaces to hold the balls 18 and 29 within the grooves. Optional shields 20 and 22 are shown in place between the inner and outer races in order to prevent dirt and road grime from entering the ball bearing. Of course, these shields are not mandatory, although they have been shown to prolong the life of the bearings. If the bearings have steel balls, there is usually a certain amount of oil or other lubricant to prevent friction, and that oil collects dust and grime and becomes a gummy mess in the bearing.

Inner sleeve 30 is of a substantially tubular shape and is shown as being substantially the same thickness as the inner races 16 and 28. Once clamped together with the fastener, the force exerted between the two races is counteracted by flanges 34 and 42 applying force against the outside surface of inner races 16 and 28. The flanges 34 and 42 may extend outwardly to the outer periphery of outer races 14 and 26, covering the shields 20 and 22 if they are present. If not, then the extension of the flanges 34 and 42 may act like a shield.

Inner sleeve 30 is sized to separate bearings 12 and 24 within the bearing recesses of the wheel hub, while bearing caps 32 and 40 are sized so as not to touch in the middle of the wheel hub. The inner diameters 37 and 50 of bearings 12 and 24 are slightly greater than the outer diameters 36 and 51 of bearing caps 32 and 40, having a clearance of from about 0.0025 inches to about 0.025 inches. Therefore, the bearing caps slide into the bearings and fit snugly so that when the fastener is put into place, these components fit together nicely. As the inner diameter of the inner sleeve 30 is the same as the bearings 12 and 24, the bearing caps 32 and 40 also fit within the inner sleeve, with a similar clearance dimension. Inner diameters 38 and 52 of bearing caps 32 and 40 are adapted and sized to receive a fastener (not shown).

Figure 2B:
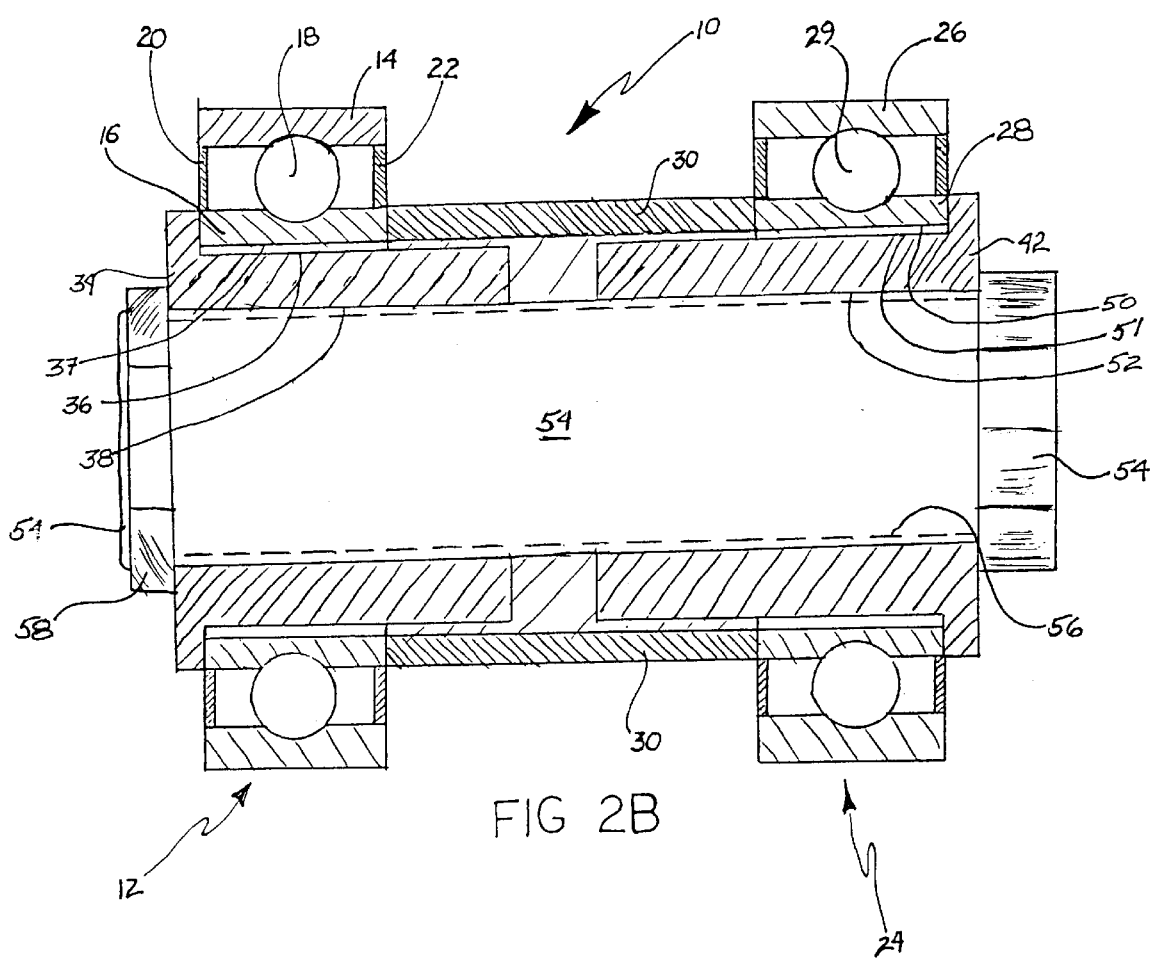
FIG. 2B is a side elevational cutaway view of the bearing mechanism with the wheel axle inserted.

Referring next to FIG. 2B, the same bearing mechanism is shown as in FIG. 2A; however, FIG. 2B shows the fastener 54 inserted therethrough. The fastener may include any suitable fastener, and is preferably the axle arrangement purchased with the skates, scooter or skateboard. Otherwise, a bolt and nut will do the job. In the drawing, fastener 54 is a bolt which is secured by nut 58, and all the components of the bearing mechanism can be seen in their proper places, held snugly against one another by the force exerted by the fastener. Again, the inner sleeve 30 and the flanges 34 and 42 are shown as only extending to contact the inner races 16 and 28 of first and second bearings 12 and 24, although those flanges can extend further outwardly.

The clearance between the fastener and the bearing caps is close, as the inner diameters of the bearing caps 32 and 40 are from about 0.0005 inches to about 0.025 inches bigger than the outer diameter of fastener 54. Needless to say, the tighter the tolerance, the better the maintenance of the desired parallel bearing/perpendicular forces arrangement as described above. By fitting the fastener in a snug relationship with the bearing caps and the inner sleeve, the relationship of all the components can be assured, resulting in little, if any, readjustment as the wheels are operated.

Figure 3:
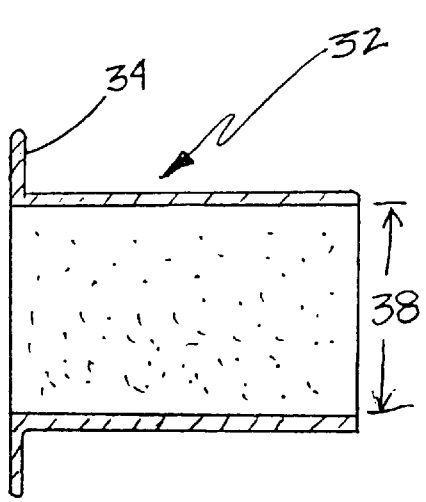
FIG. 3 is a side elevational cutaway view of a bearing cap.

Looking next to FIG. 3, there is illustrated a cutaway view of the bearing cap 32 in accordance with the present invention. The flange is denoted as numeral 34, while the inside diameter in the bearing cap itself is shown as 38. The bearing cap may be made of any suitable material, although it is preferably made of aluminum. The bearing cap can be made of various sizes, such as having a diameter of 6 mm, 7 mm or 8 mm to accommodate various applications. As the bearings will generally be the same size, the easiest and least expensive method for adapting this bearing mechanism to different applications would be to change the diameter of the bearing cap. A suitable thickness for the flange portion 34 of the bearing cap 32 is between from about 0.01 inches to about 0.25 inches, preferably from about 0.03 to about 0.05 inches, and most preferably about 0.039 inches.

Figure 4:
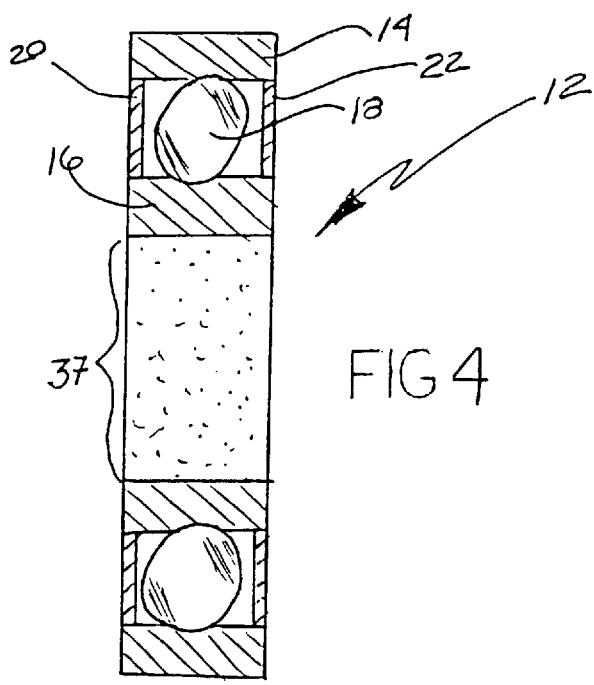
FIG. 4 is a side elevational cutaway view of a typical ball bearing.

FIG. 4 is a side elevational cutaway view of the bearings utilized for this invention. As seen before with references to FIGS. 1, 2A, and 2B, bearing 12 includes a circular inner race 16 and a circular outer race 14. As seen in FIG. 4, these two races have grooved interior surfaces to hold the ball in place once the bearing has been assembled. Balls 18 are shown as being held within the grooves, while optional inner and outer shields 20 and 22, respectively. The inner diameter 37 of the bearing allows for clearance with the fastener to be inserted therethrough.

Figure 5:
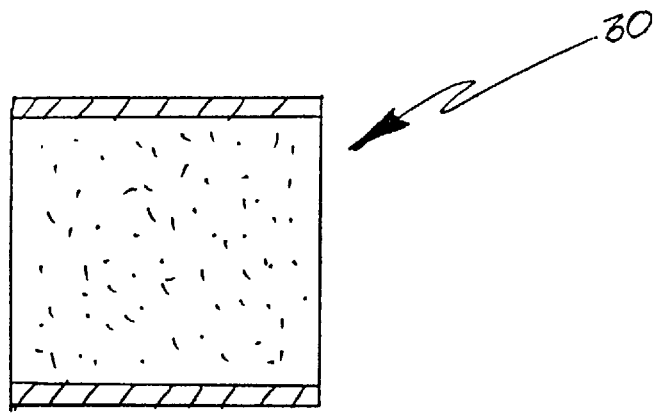
FIG. 5 is a side elevational view of a cutaway of an inner sleeve made in accordance with the present invention.

FIG. 5 is a side cutaway view of the inner sleeve 30 in accordance with the present invention. The proper dimensions and clearances are discussed above with reference to FIGS. 1, 2A and 2B. For the application of conventional wheels used for personal transport devices, the length required for the inner sleeve is equal to or greater than the internal distance between the bearing recesses of the wheel itself, although the length of the inner sleeve 30 is preferably 0.003 inches or more greater than the internal distance between the bearing recesses, and most preferably is from about 0.004 to about 0.008 inches greater than that distance.

Although the disclosure and description has been generally limited to a bearing mechanism for a personal transport device such as a skate, scooter or skateboard, it will be apparent that other types of applications can utilize the bearing mechanism of the present invention. Where small clearance dimensions are cited, the other bearing mechanism applications may require commensurately different dimensions for smaller or larger applications. With the wide variations possible with the structure, materials, and dimensions of the present invention, which are all within the scope of this concept and invention, one is cautioned not to restrict the invention to the embodiments which have been specifically disclosed and illustrated, but rather one is encouraged to determine the scope of the invention only with reference to the following claims.

INDUSTRIAL APPLICABILITY

The present invention finds utility as bearing mechanisms in the wheels of popular personal transport devices such as in-line skates, skateboards, scooters and the like. The present bearing mechanisms may also be usable in any other application that incorporates a substantially parallel dual bearing mechanism.

What is claimed is:

1. A bearing mechanism, comprising:

two substantially identical ball bearings, each having a longitudinal axis and an inner and an outer race with grooved surfaces facing each other in the races, and each bearing having nine bearing balls located within the grooved surfaces and held therein between the inner and outer races, said bearings being placed in a substantially parallel configuration once assembled in the resultant bearing mechanism such that inner and outside surfaces of the bearings and their respective inner and outer races become defined;

an inner tubular sleeve having a longitudinal axis and extending between and against the two substantially parallel ball bearings, said inner sleeve having a thickness and an outer diameter that substantially matches the dimensions of the inner races of the ball bearings, whereby the inner sleeve exerts forces substantially parallel to the longitudinal axes of the bearings once assembled, and said forces are being exerted by the inner sleeve between and against the inside surfaces of the inner races of the two ball bearings after they are assembled;

two bearing caps to be inserted through the two ball bearings, said bearing caps having a substantially tubular shape, each with a flange extending outwardly from one end of the tubular shaped bearing cap, said flanges having thicknesses matching the dimensions of the inner race such that, once assembled, the flanges contact the outside surfaces of the inner races of the substantially parallel ball bearings, exerting a force on the outside surface of the inner race in a substantially parallel direction with respect to the longitudinal axes of the ball bearings; and said bearing mechanism adapted to receive a substantially cylindrical fastener having an outer diameter, said fastener to extend through the two ball bearings, the inner sleeve and the two bearing caps, said fastener adapted to hold the bearing mechanism together such that the two ball bearings are held in a substantially parallel fashion, the longitudinal axis of the inner sleeve being substantially parallel to the longitudinal axes of the two ball bearings, and the two bearing caps being inserted through the ball bearings and the inner sleeve;

whereby forces exerted by the fastener once assembled pull the flanges against the outside surfaces of both of the inner races of the substantially parallel ball bearings and the inside surfaces of both of the inner races into tight contact with the inner sleeve, resulting in substantially equal forces against either side of the inner races to keep them in constant alignment with respect to one another.

2. The bearing mechanism of claim 1, wherein the nine balls of each of the ball bearings are approximately one eighth inch in diameter.

3. The bearing mechanism of claim 1, wherein the ball bearings have an outside diameter of approximately 22 mm, and an inside diameter of approximately 10 mm, and the width of the bearings is about 6 mm.

4. The bearing mechanism of claim 1, wherein the difference between the inner diameters of the bearing caps and the outer diameter of the fastener is from about 0.0025 inches to about 0.025 inches for clearance.

5. The bearing mechanism of claim 1, wherein the difference between the inner diameters of the inner races of the ball bearings and the outer diameter of the bearing caps is from about 0.0025 inches to about 0.025 inches for clearance.

6. A wheel and bearing mechanism assembly, comprising:

a wheel suitable for use on personal transport devices including in-line skates, skateboards, and scooters, said wheel having a wheel hub made of a hard plastic core in the center of the wheel, and said wheel being made of a cast polyurethane, said wheel hub having an aperture through the center of the wheel to receive a fastener therethrough, and said aperture also having recesses located in the wheel hub to receive ball bearings;

two substantially identical ball bearings sized to be received within the bearing recesses of the wheel hub, each ball bearing having a longitudinal axis and an inner and an outer race with grooved surfaces facing each other in the races, and each bearing having nine bearing balls located within the grooved surfaces and held therein between the inner and outer races, said bearings being placed in a substantially parallel configuration once assembled in the resultant wheel and bearing mechanism assembly such that inside and outside surfaces of the bearings and their respective inner and outer races become defined, where the inside surfaces of the outer races are in contact with the bearing recesses inside the wheel;

an inner tubular sleeve having a longitudinal axis and extending between and against the two substantially parallel ball bearings, said inner sleeve having a thickness and an outer diameter that substantially matches the dimensions of the inner races of the ball bearings, whereby the inner sleeve exerts forces substantially parallel to the longitudinal axes of the bearings once assembled, and said forces are being exerted by the inner sleeve between and against the inside surfaces of the inner races of the two ball bearings after they are assembled;

two bearing caps to be inserted through the two ball bearings, said bearing caps having a substantially tubular shape, each with a flange extending outwardly from one end of the tubular shaped bearing cap, said flanges having thicknesses matching the dimensions of the inner race such that, once assembled, the flanges contact the outside surfaces of the inner races of the substantially parallel ball bearings, exerting a force on the outside surface of the inner race in a substantially parallel direction with respect to the longitudinal axes of the ball bearings; and said bearing mechanism adapted to receive a substantially cylindrical fastener having an outer diameter, said fastener to extend through the aperture of the wheel and the two ball bearings, the inner sleeve and the two bearing caps, said fastener adapted to hold the bearing mechanism together such that the two ball bearings are held in a substantially parallel fashion within the bearing recesses in the wheel hub, the longitudinal axis of the inner sleeve being substantially parallel to the longitudinal axes of the two ball bearings, and the two bearing caps being inserted through the ball bearings and the inner sleeve;

whereby forces exerted by the fastener pull the entire assembly together, whereby the flanges contact against the outside surfaces of both of the inner races of the substantially parallel ball bearings, pulling the inside surfaces of both of the inner races into tight contact with the inner sleeve, resulting in substantially equal forces against either side of the inner races to keep them in constant alignment with respect to one another, in addition to the force of the bearing recess against the inner surface of the outer races of the ball bearings to further provide a stabilizing force.

7. The wheel and bearing mechanism assembly of claim 6, wherein the nine balls of each of the ball bearings are approximately one eighth inch in diameter.

8. The wheel and bearing mechanism assembly of claim 6, wherein the ball bearings have an outside diameter of approximately 22 mm, and an inside diameter of approximately 10 mm, and the width of the bearings is about 6 mm.

9. The wheel and bearing mechanism assembly of claim 6, wherein the difference between the inner diameters of the bearing caps and the outer diameter of the fastener is from about 0.0025 inches to about 0.025 inches for clearance.

10. The wheel and bearing mechanism assembly of claim 6, wherein the difference between the inner diameters of the inner races of the ball bearings and the outer diameter of the bearing caps is from about 0.0025 inches to about 0.025 inches for clearance.

11. The wheel and bearing mechanism assembly of claim 6, wherein the length of the inner sleeve is equal to the internal distance between the bearing recesses.

12. The wheel and bearing mechanism assembly of claim 6, wherein the length of the inner sleeve is between about 0.002 inches and about 0.009 inches greater than the internal distance between the bearing recesses.

13. A bearing mechanism, comprising:

two substantially identical ball bearings, each having a longitudinal axis and an inner and an outer race with grooved surfaces facing each other in the races, and each bearing having a multitude of bearing balls located within the grooved surfaces and held therein between the inner and outer races, said bearings being placed in a substantially parallel configuration once assembled in the resultant bearing mechanism such that inner and outside surfaces of the bearings and their respective inner and outer races become defined;

an inner tubular sleeve having a longitudinal axis and extending between and against the two substantially parallel ball bearings, said inner sleeve having a thickness and an outer diameter that extends outwardly to cover at least a portion of the races of the ball bearings, whereby the inner sleeve exerts forces substantially parallel to the longitudinal axes of the bearings once assembled, and said forces are being exerted by the inner sleeve between and against the inside surfaces of the inner races of the two ball bearings after they are assembled;

two bearing caps to be inserted through the two ball bearings, said bearing caps having a substantially tubular shape, each with a flange extending outwardly from one end of the tubular shaped bearing cap, said flanges having thicknesses to cover at least a portion of the dimension of the races such that, once assembled, the flanges contact the outside surfaces of the races of the substantially parallel ball bearings, exerting a force on the outside surfaces of the races in a substantially perpendicular direction with respect to the longitudinal axes of the ball bearings; and said bearing mechanism adapted to receive a substantially cylindrical fastener, said fastener to extend through the two ball bearings, the inner sleeve and the two bearing caps, said fastener adapted to hold the bearing mechanism together such that the two ball bearings are held in a substantially parallel fashion, the longitudinal axis of the inner sleeve being substantially parallel to the longitudinal axes of the two ball bearings, and the two bearing caps being inserted through the ball bearings and the inner sleeve;

whereby forces to be exerted by the fastener once assembled would pull the flanges against the outside surface of the races of the substantially parallel ball bearings and the inside surfaces of both of the races into tight contact with the inner sleeve, resulting in substantially equal forces against either side of the races to keep them in constant alignment with respect to one another.

14. The mechanism of claim 13, wherein the number of ball bearings includes more than about seven balls.

15. The mechanism of claim 13, wherein the outside diameter of the bearing mechanism is about 22 mm.

* * * * *